United States Patent
Zhu et al.

(10) Patent No.: US 10,462,806 B2
(45) Date of Patent: Oct. 29, 2019

(54) METHODS AND APPARATUSES FOR DYNAMIC BEAM PAIR DETERMINATION

(71) Applicant: QUALCOMM Incorporated, San Diego, CA (US)

(72) Inventors: Jun Zhu, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/841,211

(22) Filed: Dec. 13, 2017

(65) Prior Publication Data

US 2019/0182852 A1    Jun. 13, 2019

(51) Int. Cl.
| | | |
|---|---|---|
| *H04W 72/12* | (2009.01) | |
| *H04W 72/02* | (2009.01) | |
| *H04W 72/04* | (2009.01) | |
| *H04B 7/0408* | (2017.01) | |
| *H04W 72/00* | (2009.01) | |
| *H04B 7/06* | (2006.01) | |
| *H04B 7/08* | (2006.01) | |
| *H04W 72/08* | (2009.01) | |

(52) U.S. Cl.
CPC ...... *H04W 72/1231* (2013.01); *H04B 7/0408* (2013.01); *H04B 7/0695* (2013.01); *H04B 7/088* (2013.01); *H04W 72/005* (2013.01); *H04W 72/02* (2013.01); *H04W 72/046* (2013.01); *H04W 72/048* (2013.01); *H04B 7/0691* (2013.01); *H04W 72/082* (2013.01); *H04W 72/085* (2013.01)

(58) Field of Classification Search
CPC ........... H04W 72/1231; H04W 72/005; H04W 72/02; H04W 72/046; H04W 72/048; H04W 72/082; H04W 72/085; H04B 7/0408; H04B 7/0691
USPC .......................................................... 370/312
See application file for complete search history.

(56) References Cited

U.S. PATENT DOCUMENTS

| | | | | |
|---|---|---|---|---|
| 9,871,570 B1* | 1/2018 | Kerhuel | ............... | H04B 7/0617 |
| 2009/0067539 A1* | 3/2009 | Maltsev | ............... | H04B 7/0617 |
| | | | | 375/296 |
| 2013/0182683 A1* | 7/2013 | Seol | .................... | H04W 72/046 |
| | | | | 370/335 |
| 2015/0257073 A1* | 9/2015 | Park | ..................... | H04B 7/0408 |
| | | | | 370/331 |

(Continued)

*Primary Examiner* — Stephen J Clawson
(74) *Attorney, Agent, or Firm* — QUALCOMM Incorporated

(57) ABSTRACT

The choice of a transmit (Tx)-Receive (Rx) beam pair out of many available beam pairs between a base station and a millimeter wave (mmW)-capable UE is directly related to the performance of transmission between the base station and the UE. A method, apparatus, and computer-readable medium at a transmitting user equipment (UE) capable of (mmW) communication are disclosed to determine a new serving Tx-Rx beam pair based on cumulative strengths of a plurality of Tx-Rx beam pairs. The UE may iteratively perform a process of, until a predetermined number of synchronization cycles is reached: selecting one of the plurality of Transmit (Tx)-Receive (Rx) beam pairs based at least in part on a scheduling opportunity value of the selected Tx-Rx beam pair that has not been measured for a current synchronization period; and measuring a strength of the selected Tx-Rx beam pair.

30 Claims, 11 Drawing Sheets

(56) References Cited

U.S. PATENT DOCUMENTS

2016/0192329 A1* 6/2016 Park .................. H04W 72/02
　　　　　　　　　　　　　　　　　　　　370/329
2017/0207843 A1* 7/2017 Jung ................ H04B 7/0408
2017/0207845 A1* 7/2017 Moon ................ H04B 7/088
2018/0227887 A1* 8/2018 Hakola .............. H04B 7/022

* cited by examiner

METHODS AND APPARATUSES FOR DYNAMIC BEAM PAIR DETERMINATION

BACKGROUND

Field

The present disclosure relates generally to wireless communication systems, and more particularly, to a methods and apparatuses for dynamic beam pair selection.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Wireless communication systems may also include, or support networks used for vehicle based communications, also referred to as vehicle-to-everything (V2X), vehicle-to-vehicle (V2V) networks, and/or cellular V2X (C-V2X) networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Such network supporting vehicle based communications, however, may also be associated with various requirements, e.g., communication requirements, security and privacy requirements, etc. Other example requirements may include, but are not limited to, reduced latency requirements, higher reliability requirements, and the like. For example, vehicle-based communications may include communicating sensor data that may support self-driving cars. Sensor data may be used between vehicles to improve the safety of self-driving cars.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The choice of a transmit (Tx)-Receive (Rx) beam pair out of many available beam pairs between a base station and a mmW-capable UE is directly related to the performance of transmission between the base station and the UE. A currently prevalent approach to selecting an active Tx-Rx beam pair is to measure each beam pair from multiple available beam pairs in a round-robin manner and to determine a new active beam pair based on the measurement results. In this round-robin manner, every beam pair has equal scheduling opportunity to be measured in a synchronization cycle. In fact, due to factors such as line of sight (LoS) and proximity between the beam pairs, chances for the beam pairs to be selected as the active beam pair are different. The round robin approaches do not distinguish among the beam pairs and thus may result in long latency in selecting the active beam pair.

Thus, there is a need for a method, apparatus, and computer-readable medium at a user equipment (UE) in a mmW communications environment to stochastically assign a scheduling opportunity to each beam pair, taking into consideration factors such as LoS, proximity, among others, to quickly converge on one a good active beam pair. A method, apparatus, and computer-readable medium at a transmitting user equipment (UE) capable of (mmW) communication are disclosed to determine a new serving Tx-Rx beam pair based on cumulative strengths of a plurality of Tx-Rx beam pairs. The UE may iteratively perform a process until a predetermined number of synchronization cycles is reached, the process including: selecting one of the plurality of Transmit (Tx)-Receive (Rx) beam pairs based at least in part on a scheduling opportunity value of the selected Tx-Rx beam pair that has not been measured for a current synchronization period; and measuring a strength of the selected Tx-Rx beam pair.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
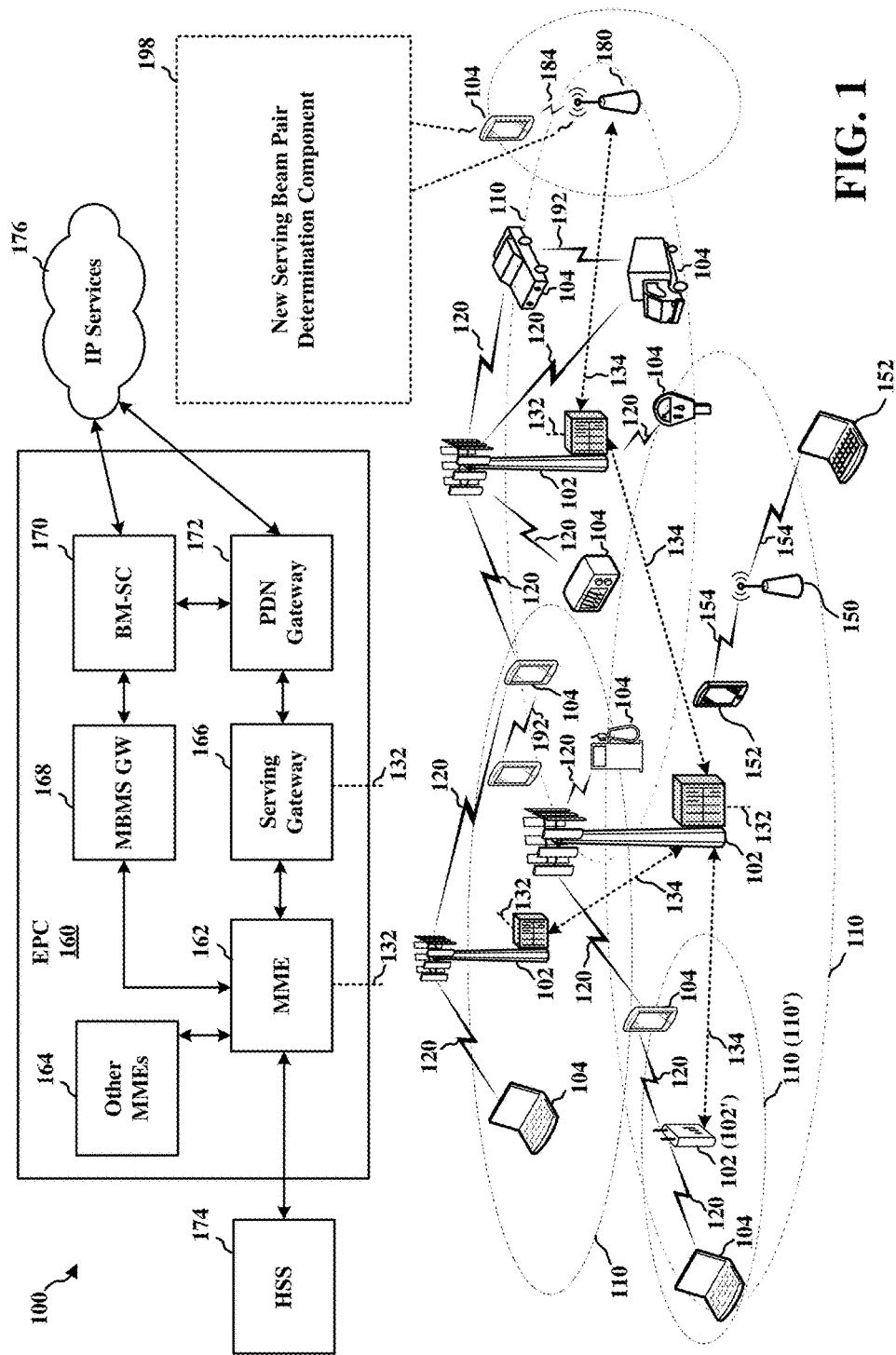
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104s may be configured to include an active beam pair selection component (198) that enables the UEs 104 to determine an active or new serving beam pair among multiple beam pairs efficiently. This in turn enables the UE to set up a link between the UE and the base station with minimal latency, especially in a dynamical environment, where the UE is in a fast motion and the current active beam pair may need frequent updating.

Figure 2:
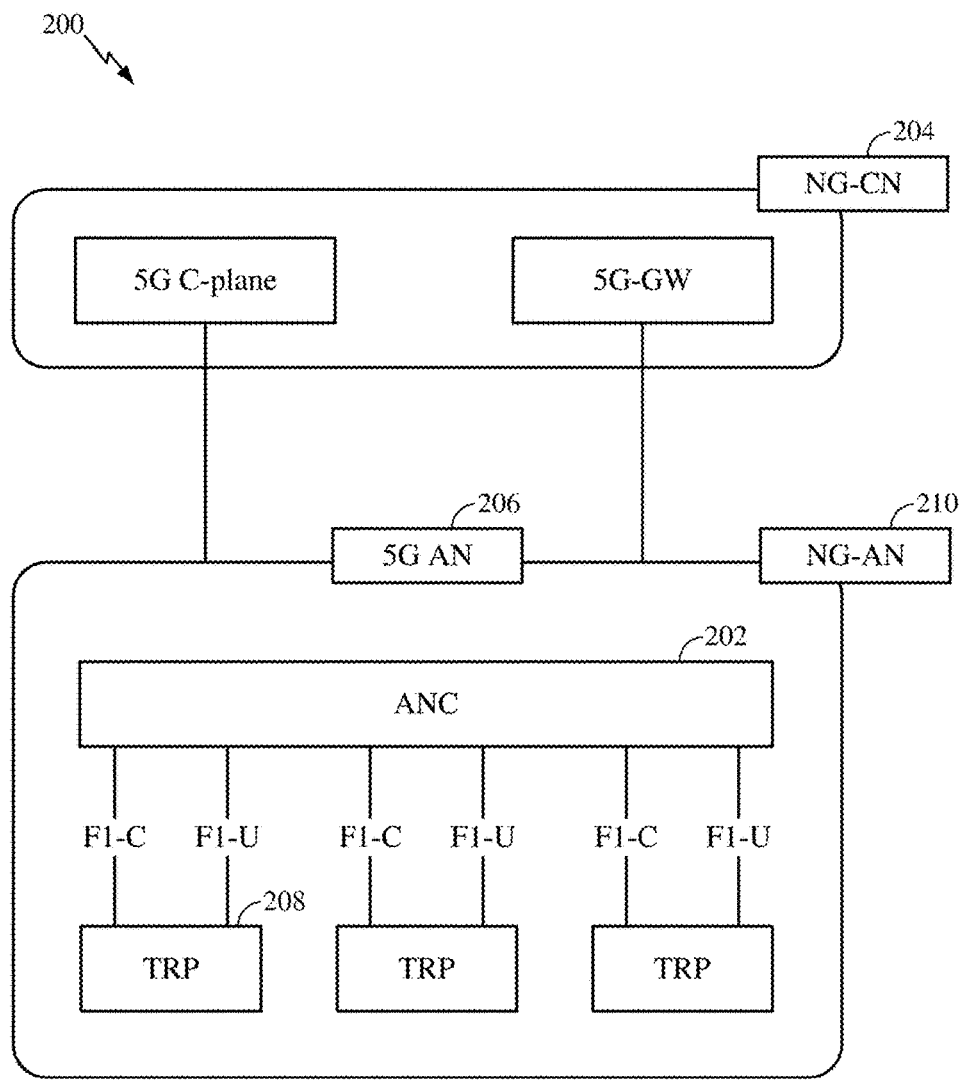
FIG. 2 illustrates an example logical architecture of a distributed radio access network.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be present within a TRP and/or across TRPs via the ANC 202. According to aspects, no inter-TRP interface may be needed/present.

According to aspects, a dynamic configuration of split logical functions may be present within the architecture 200. In one example aspect, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
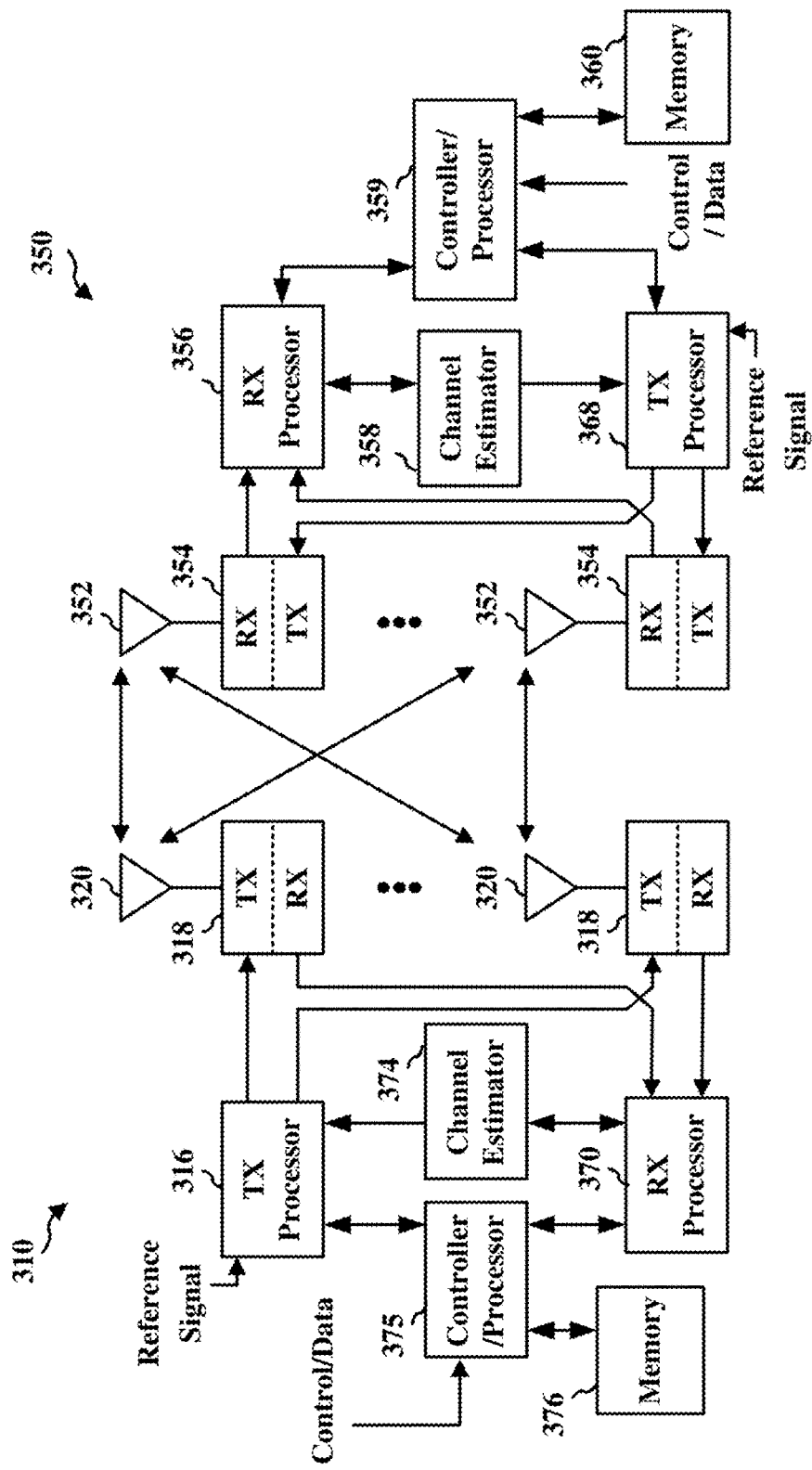
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
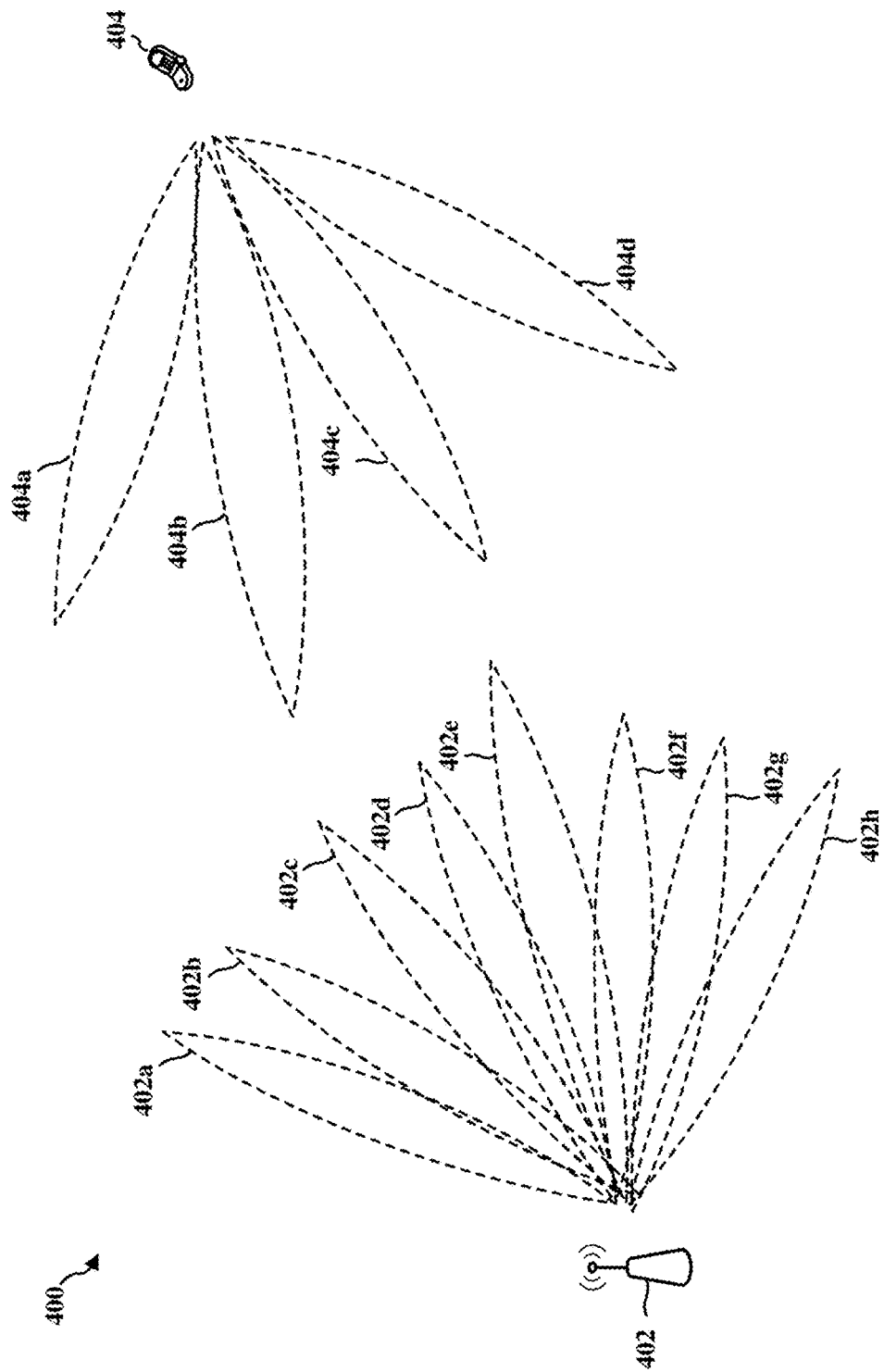
FIG. 4 is a diagram illustrating a base station in communication with a UE in accordance with one or more aspects of the present disclosure.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figures 5A, 5B:
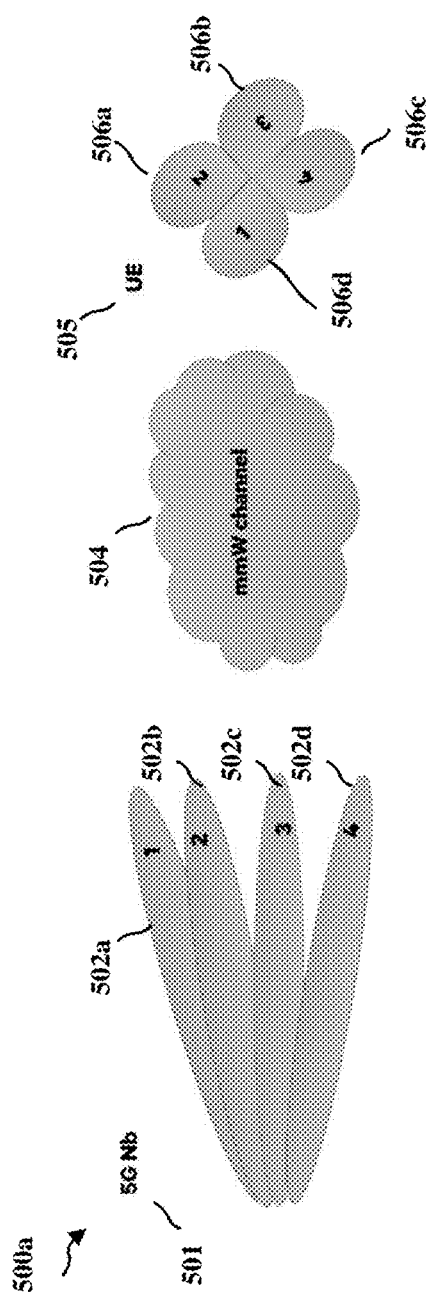
FIG. 5a is a diagram illustrating a base station in communication with a UE in accordance with one or more aspects of the present disclosure.
FIG. 5b illustrates example sequence of beam pairs for measurement, in accordance with one or more aspects of the present disclosure.

FIG. 5a is a diagram 500a illustrating a base station 501 in communication with a UE 505, in accordance with one or more aspects of the present disclosure. The diagram 500a shows a set of transmit beam 502a-502d at a 5G base station and a set of receive beam 506a-506d at the UE. One of the transmit beams 502a-502d may pair up with one of the receive beam 506a-506d to form an active Tx-Rx beam pair to carry a signal through a millimeter wave channel 504 between the base station 501 and the UE 505.

In one example aspect, before any communication between 5G mmW base station 501 and the UE 505, the base station 501 may first broadcast all 4 (Tx) beams 1-4 or 502a-502d in a beam reference signal (BRS) cycle to all the device in the transmission range. The UE 505 in turn pairs up the received Tx beams with its Rx beams to find the most suitable beam pair for transmissions between the UE 505 and the base station 501. Larger the number of Tx beams and number of Rx beams are, longer it may take to find the most suitable beam pair, or a new active beam pair. In the diagram 500, there are 4 Tx beams and 4 Rx beams. That is, the size of Tx beams and Rx beams are M=4, and N=4 respectively.

A BRS cycle is a synchronization cycle which may include a predetermined number of synchronization periods. Different terms may be used for a synchronization period. For example, a synchronization period may be referred to as a synchronization frame (SF). During a synchronization frame, a number of candidate Tx-Rx beam pairs may be selected and measured to determine a new active Tx-Rx beam pair. For example, in one SF, each of Tx beams may be paired with one of the Rx beams to form a candidate Tx-Rx beam pair sequence for beam pair measurement, if the selection method is to allow Tx beams to vary. To select a reasonably stable active beam pair, predetermined number of synchronization cycles may be needed.

The quality of a candidate Tx-Rx beam pair, in one aspect, may be measured in terms of beam gain. Several factors may affect the measured beam gain of a candidate beam pair, including line of sight (LoS). In general, a beam pair with LoS has a better beam gain than a beam pair without LoS, provided everything else being equal.

In one example aspect, during one synchronization cycle, all Tx beams are expected to emit in a fixed pattern, because a base station may not change its location frequently. Referring to FIG. 5a again, the Tx-Rx beam pair (2,1) and the Tx-Rx beam pair (3,1) are expected to have better beam gains because Rx beam 1 has a LoS with the Tx beams 2 and 3, if only LoS is considered for beam gain measurements.

FIG. 5b illustrates an example sequence 500b of Tx-Rx beams pairs, in accordance with one or more aspects of the present disclosure. Based on the Tx-Rx beam pairs of FIG. 5a, FIG. 5b illustrates a sequence of beam pairs for measurement based on a round-robin approach. The example sequence 500b illustrates a synchronization cycle or BRS cycle that includes 4 synchronization frames 512a-512d. According to the round robin approach, one of the Rx beams is selected sequentially to pair with each of Tx beams within a SF to form M candidate beam pairs for beam gain measurement, M being the size of Tx beam set. As shown in FIG. 5b, during the SF 512a, the Rx beam 1 is paired with each of the 4 Tx beams 1 through 4, for measurement, and then next Rx beam, Rx beam 2, is paired with each of the 4 Tx beams 1 through 4 for measurement. All N Rx beams are measured in a round-robin fashion.

According to the existing approach, it normally requires at least a complete BRS cycle for all Rx beams to be paired with Tx beams for beam gain measurement to find a new active Tx-Rx beam pair. As a UE may have more than one Rx beams, it may take a number of BRS cycles before finding a good active beam pair. This may result in a non-trivial latency and undesirable delay in establishing a connection between the base station and the UE. Based on the round-robin approach to determining a new active Tx-Rx beam pair, the length of latency is proportional to the number of Rx beams.

Thus, the existing round-robin approach likely wastes synchronization SF resources, in part because some of the beam pair may have little or zero chance to be selected as the active beam pair, due to their directions, lack of LoS or other factors. For example, referring to both FIG. 5a and FIG. 5b, Tx beam 2 and 3 should see more gains than 1 and 4, if LoS is assumed. Accordingly, assigning the 4 Tx beams the same equal scheduling opportunity for measurement in one BRS cycle may not be necessary and may be wasteful. The term scheduling opportunity may be used interchangeably with the term opportunity unless otherwise noted in the present disclosure.

Figure 6:
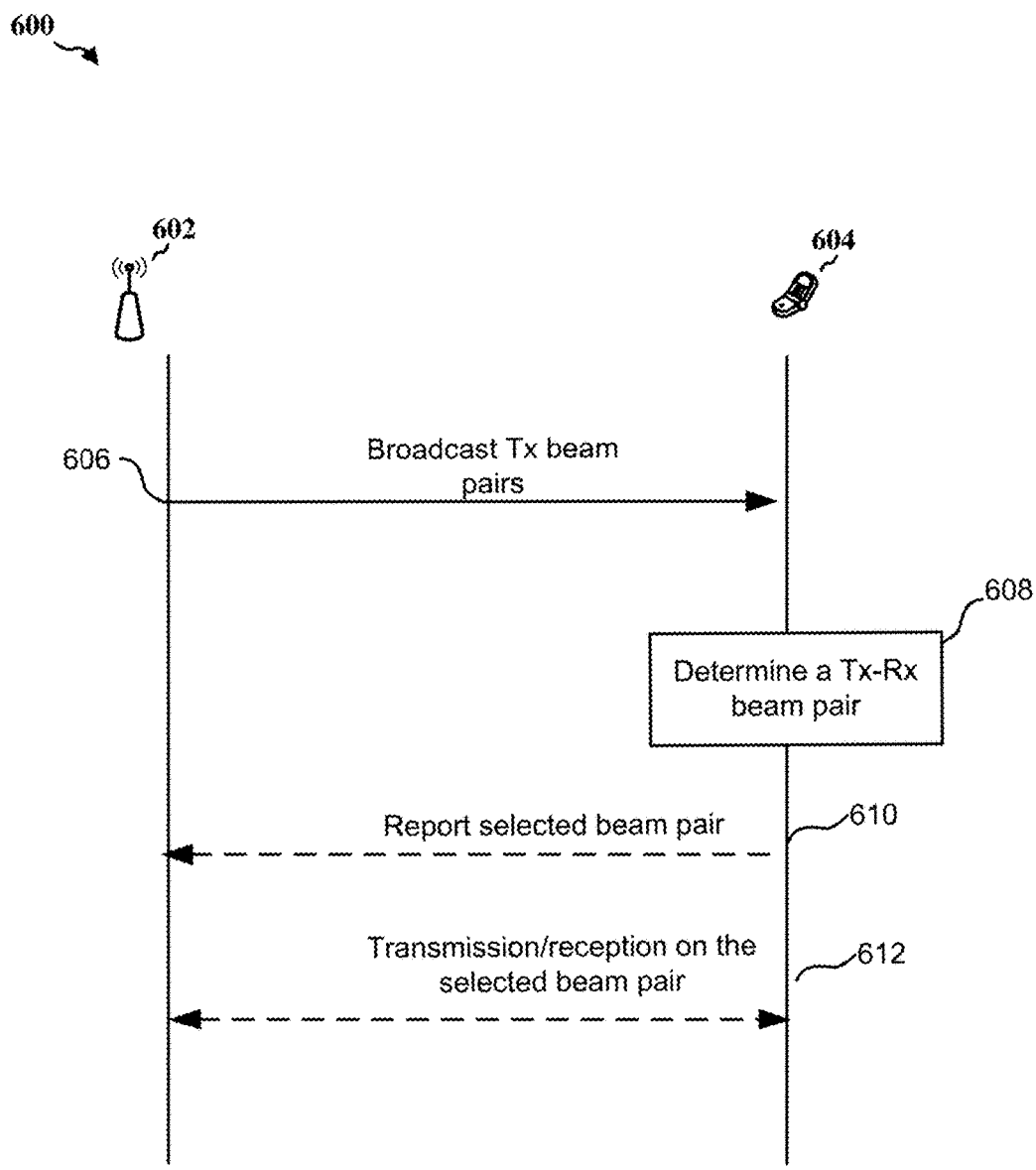
FIG. 6 illustrates an example of a wireless communications system that supports dynamic stochastic beam selection in accordance with one or more aspects of the present disclosure.

FIG. 6 illustrates an example of a wireless communications system 600 that supports dynamic stochastic beam pair selection in accordance with one or more aspects of the present disclosure. The wireless communications system 600 includes a base station 602 and a UE 604. At 606, the base station 602 broadcast all Tx beams available at the base station 602.

Figure 10:
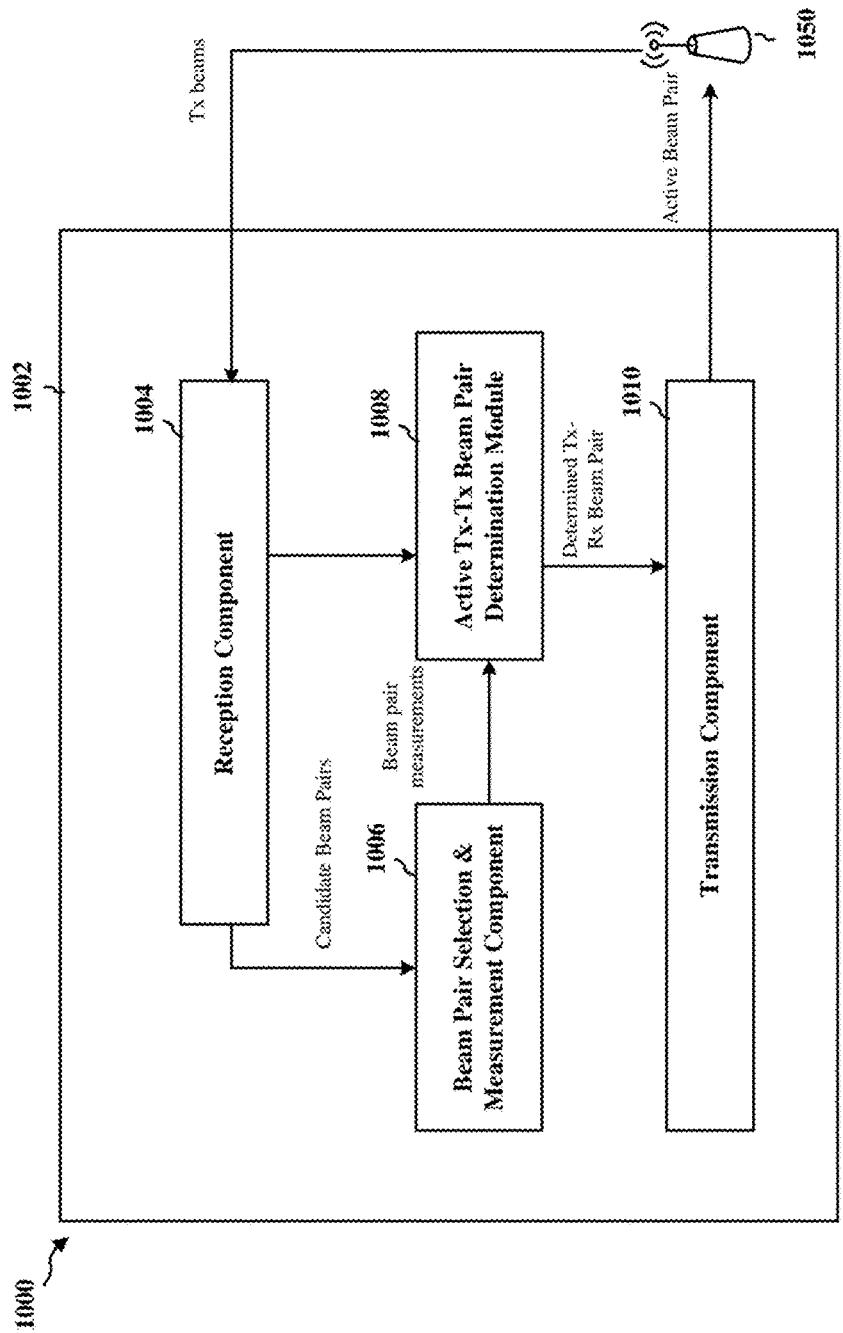
FIG. 10 is a conceptual data flow diagram illustrating the data flow between different means/components in an exemplary apparatus in accordance with one or more aspects of the present disclosure.
Figure 11:
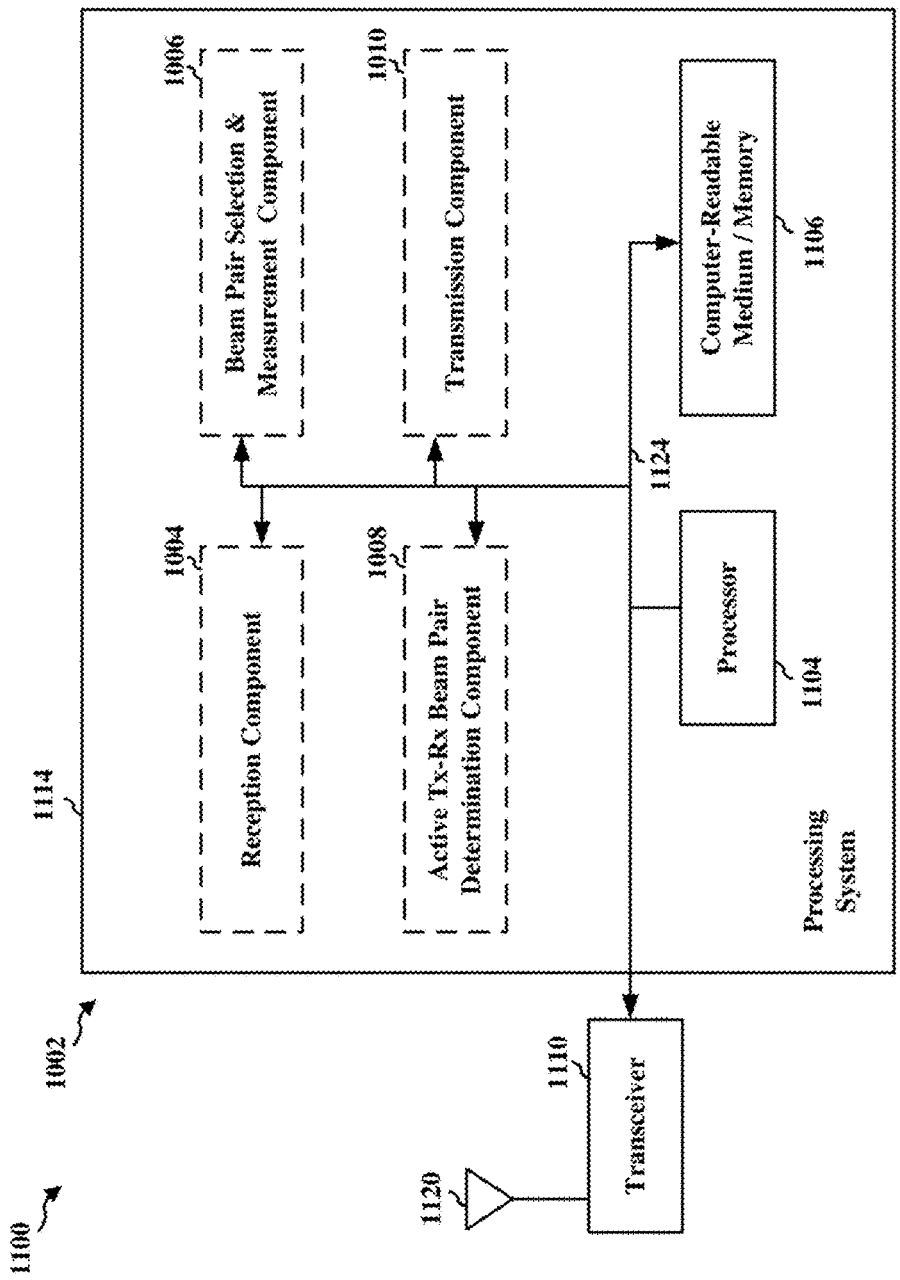
FIG. 11 is a diagram illustrating an example of a hardware implementation for an apparatus employing a processing system in accordance with one or more aspects of the present disclosure.

At 608, the UE 606 applies a dynamic stochastic beam pair selection process to select candidate Tx-Rx beam pairs for measurement. Based on the dynamic stochastic beam pair selection approach, those beam pairs with a higher chance to be selected as the active beam pair are given more scheduling opportunities to be selected for measurement during a synchronization cycle. This may result in a shortened latency and delay in finding a desirable active beam pair and establishing a connection between the base station and the UE efficiently. The details of the dynamic stochastic beam pair selection process or method are shown in FIGS. 7, 10, and 11 and described in the corresponding sections.

At 610, the UE 604 reports the selected beam pair to the base station 602. Then at 612, the UE 604 and base station 602 receive and transmit data using the determined active beam pair.

Figure 7:
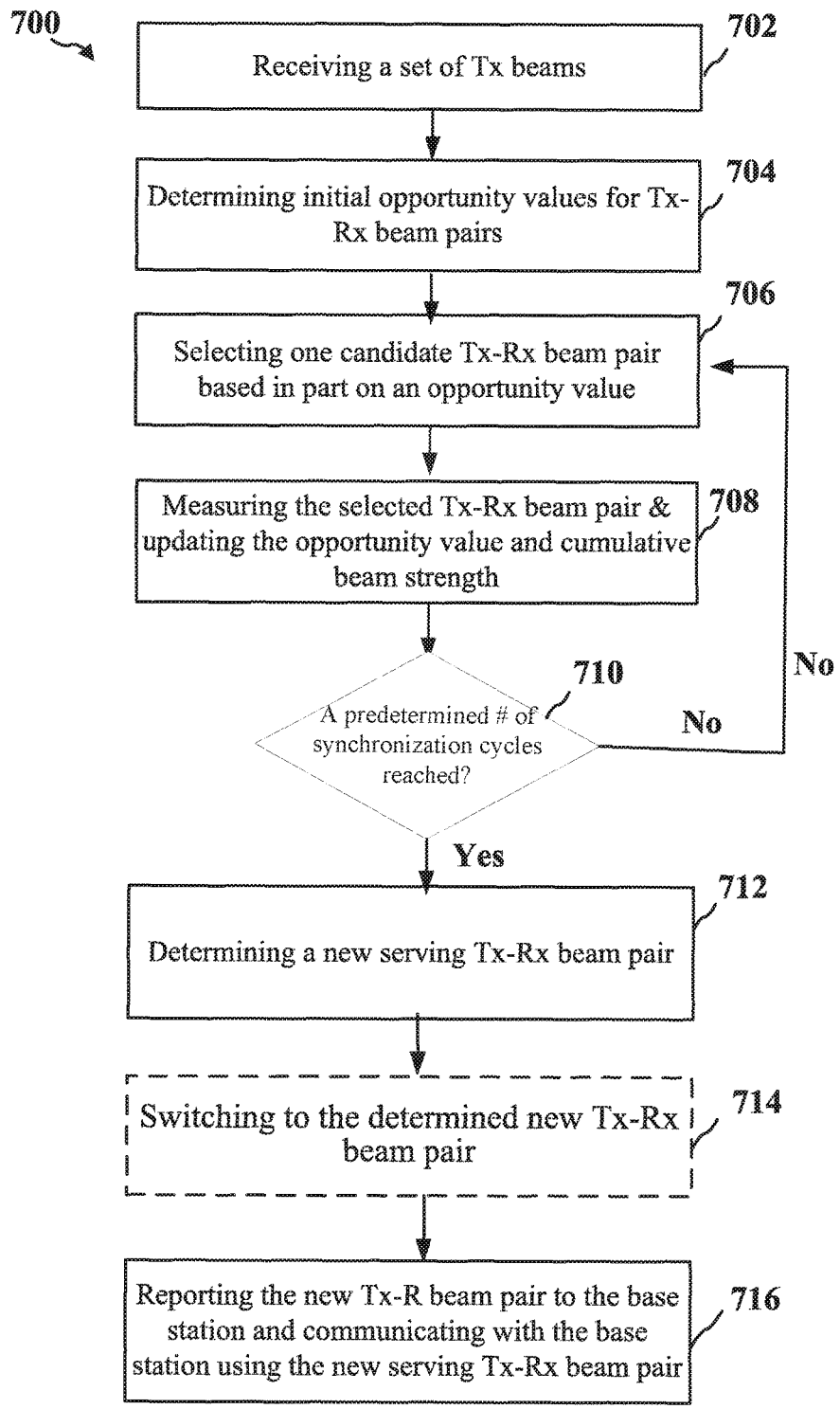
FIG. 7 is a flowchart of a method of wireless communication in accordance with one or more aspects of the present disclosure.

FIG. 7 is a flowchart 700 for a method of wireless communication in accordance with one or more aspects of the present disclosure. The method may be performed by one of the UEs 104 of FIG. 1, the UE350 of FIG. 3, the UE 604 of FIG. 6, or apparatus 1002/1002' of FIGS. 10 and 11. An optional step is indicated in a dashed boarder.

At 702, the UE receives a set of Tx beams from a serving base station. The serving base station may transmit in a broadcast message the set of Tx beams available at the base station. This way, the Tx beams become known to all the UEs within the transmission range of the base station. In one example aspect, UE pairs up a Tx beam with each of its Rx beams to form candidate Tx-Rx beam pairs for measurement for selection of a new active beam pair. If the size of the Tx beam set is M and the size of Rx beam set if N, then the number candidate beam pairs are M×N.

At 704, the UE assigns initial scheduling opportunity values to each Tx-Rx beam pair. In one example aspect, a scheduling opportunity represents a likelihood that the Tx-Rx beam pair is to be selected for measurement. According to one example aspect, a same initial scheduling opportunity value is assigned to all candidate Tx-Rx beam pairs. This approach to assigning the initial scheduling opportunity value is simple and incur minimal overhead. On the other hand, this approach may result in a longer time to converge on a suitable active or serving Tx-Rx beam pair.

In an alternative aspect, the UE may assign the initial scheduling opportunity value to each of the Tx-Rx beam pairs based on known knowledge about each beam pair. For example, knowledge may include spatial proximity between the Tx-Rx beam pair, presence or absence of LoS between the Tx-Rx beam pair, and historical beam strength data of the Tx-Rx beam pair, among other. One effect of such an approach to assigning the initial scheduling opportunity values is biasing the beam pair selection in favor of those candidate Tx-Rx beam pairs that have a better chance of becoming the active Tx-Rx beam pair.

At 706, the UE selects a candidate Tx-Rx beam pair for measurement. In one example aspect, selecting the candidate Tx-Rx beam pair may be based on the scheduling opportunity value associated with the beam pair. In one aspect, the UE is able to dynamically select a beam pair to measure during each synchronization period or synchronization frame. Each beam pair is stochastically scheduled according to the associated scheduling opportunity value.

Additionally, at 706, the UE selects the candidate Tx-Rx beam pair for measurement without a fixed Tx beam pattern or a fixed Rx beam pattern. In other words, the UE may select any of available Tx beams to pair with any of the available Rx beams to form a candidate Tx-Rx beam pair for measurement. A fixed Tx beam pattern indicates a fixed beam emission pattern by the base station. For example, in one example scenario, the base station may be stationary that does not change its location relative to the UE. A fixed Rx beam pattern indicates that the UE emission pattern is fixed, and the UE is relatively stationary to the base station. When neither Tx beams nor Rx beams has a fixed pattern, the UE's environment may be very dynamic. Accordingly, the UE may have shorter amount of time for selecting a beam pair for measurements and converge on a new serving Tx-Rx beam pair that meets the performance requirements.

In one example aspect, one beam pair is selected for measurement at one synchronization frame, if its scheduling opportunity value satisfies the following:

$$\max_{1 \le i \le MN} \{[F_i^t(x_i)]^{1/w_i}\}$$

where $w_i$ is prioritized weight for beam pair i, or priority weight, sometime also termed historical priority weight, which gives a predicted scheduling opportunity value for the beam pair i. $w_i$ may be adjustable by the UE based on a number of factors, such as a LoS or NLoS, the proximity between the beam pair, and historical performance of the beam pair, among others. $x_i$ is the latest measured beam gain value on beam pair i; $F_i^t(\bullet)$ is a cumulative density function (CDF) for the beam pair i updated at synchronization frame t. Note that $F_i^t(x)$ is the CDF function of x, which is a uniformly distributed variable between 0 and 1. When $x_i$ is evaluated for ith beam pair, $F_i^t(x_i)$ becomes a CDF value, which, as a result, also has a value between 0 and 1.

Also note that if T tends to infinity and the channel on the beam pair is stationary, the CDF is fixed, and the upper index t can be removed. Each CDF value indicates a ratio of the instantaneous and the long-term beam gain of the corresponding beam pair Based on updated CDF values on each beam pair, the beam pair with the best long-term beam gain is selected for measurement if equal priority weights are provided to all beam pairs. As such, the way of selecting a Tx-Rx candidate beam pair will likely shortens the latency for finding a suitable active Tx-Rx beam pair, because it is not necessary to measure all Tx-Rx beam pairs with equal scheduling opportunities.

It is worth noting that according to the above approach to selecting the candidate Tx-Rx beam pair for measurement, the priority weight $w_i$ provides a pre-determined scheduling opportunity for the beam pair i. Each beam pair's priority weight indicates the scheduling ratio compared to other beam pairs. The ratio between beam pair i and beam pair j's scheduling opportunity is $w_i/w_j$ and the above approach may result in allocating $w_i/\Sigma_j w_j$ scheduling opportunities for beam pair i if T tends to infinity and all channels are stationary.

At 708, the method 700 also includes updating the scheduling opportunity value. The UE may measure the selected Tx-Rx beam pair and update the scheduling opportunity value of the beam pair. In one aspect, updating the scheduling opportunity of the beam pair may include updating the priority weight of the selected beam pair, as described above, based in part on a number of factors, such as a LoS or NLoS, the proximity between the beam pair, and historical performance of the beam pair, the latest beam strength measurement, among others. Then, the scheduling opportunity may be updated based in part on the updated priority value and the latest measurement of the beam strength of the selected beam pair.

At 708, the method 700 also include updating a cumulative beam strength for the selected beam pair. When a Tx-Rx beam pair is measured during the current synchronization period, the UE may update a cumulative beam strength up to this point for the selected Tx-Rx beam pair i with the latest measurement. The cumulative beam strength or cumulative strength is one of key measures for determining the new serving beam pair after the predetermined number of synchronization cycles.

In one aspect, the measured strength of a beam pair includes one or more of a signal to noise ratio (SNR), a signal to noise/interference ratio (SNIR), a reference signal received quality (RSRQ), and a reference signal received power (RSRP) and/or the beam gain of the beam pair. The beam gain may indicate antenna power gain in terms of dB.

At 710, the UE may determine whether a predetermined number of synchronization cycles has been reached. As described before, a synchronization cycle may include a predetermined number of synchronization periods. The synchronization period may also be termed synchronization frame. In one example aspect, during one synchronization period, a number of Tx-Rx beam pairs may be measured. For example, during each of the synchronization periods 512a-512d of FIG. 5B or each of the synchronization periods 802-805 of FIG. 8, four beam pairs are measured. A predetermined number of synchronization cycles are run to provide a fair chance to each and every Tx-Rx beam pair for measurement and to gain certain level of confidence in the beam gain measurement results, to account for fast-changing emission patterns.

If the predetermined number of synchronization cycle has not been reached, the UE goes back to 706 and select another Tx-Rx beam pair for measurement, as described above. If the predetermined number of synchronization cycle has been reached, the UE at 712 determine a new serving Tx-Rx beam pair for the connection between the UE and the base station.

In one aspect, the new serving Tx-Rx beam pair is the Tx-Rx beam pair with a highest cumulative beam gains or beam strength, while the highest cumulative beam gain is a sum of beam gains of the Tx-Rx beam pair during an entire duration of the predetermined number of synchronization cycles.

At 714, the UE switches to the newly determined Tx-Rx beam pair from the current Tx-Rx beam pair. In one example aspect, the newly determined Tx-Rx beam pair may be the same as the current Tx-Rx beam pair. In this case, the step at 714 may be avoided. At 716, the UE reports the new active beam pair to the base station and start using the new serving Tx-Rx beam pair to communicate with the base station.

The flowchart 700 may be triggered for various occasions. One such occasion is when the UE enters transmission range of the base station and just receives the Tx beams broadcast from the base station. Another occasion is when the UE's location has changed in a non-trivial way such that the current serving beam pair is no longer effective, and the performance of transmission has degraded beyond a predetermined threshold.

The flowchart 700 is for illustration purpose and shows one possible process for selecting candidate beam pairs for measurement and for selecting a new active beam pair. In practice, one or more steps shown in illustrative flowchart 700 may be combined with other steps, performed in any suitable order, performed in parallel (e.g., simultaneously or substantially simultaneously), or removed. For example, reporting the new active Tx-Rx beam pair at 716 may be performed in parallel to or before switching to the new active beam pair at 714.

Figure 8:
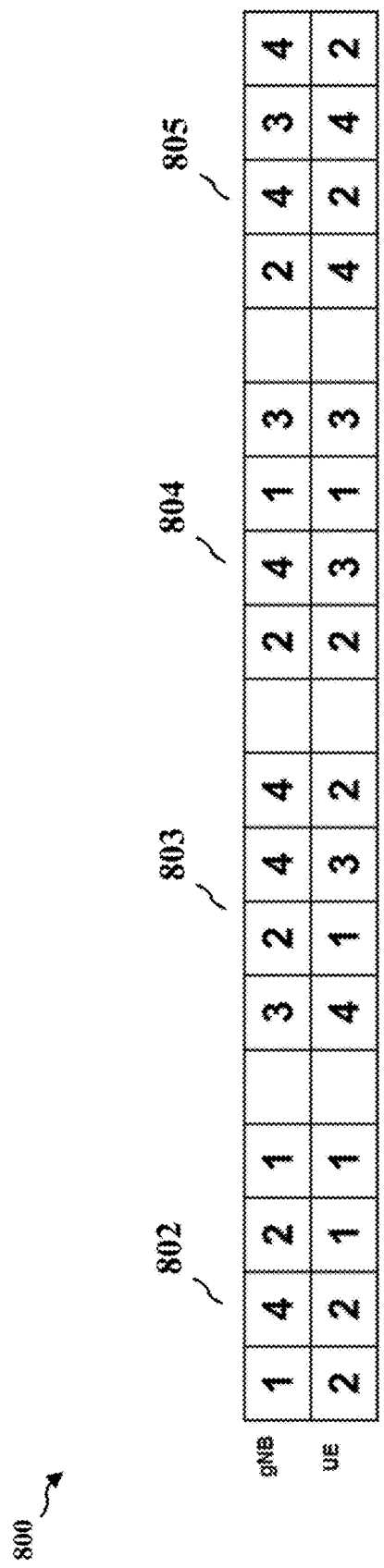
FIG. 8 illustrates an example sequence of beam pair for measurement, in accordance with one or more aspects of the present disclosure.

FIG. 8 illustrates an example beam pair sequence 800 for measurement, in accordance with one or more aspects of the present disclosure. The beam pair sequence 800 includes four synchronization periods 802-805 and within each synchronization period, four beam pairs are selected and measured. In contrast to the equal-opportunity, round-robin fixed sequence of beam pair selection and measurement, as shown in FIG. 5b, FIG. 8 shows beam pairs with dynamic, stochastically adjusted scheduling opportunities biasing in favor of those beam pairs that have a better chance of becoming the new active or serving beam pair.

As shown in FIG. 8, nether Tx beams nor Rx beams have a fixed beam pattern. Consequently, the UE may freely choose any Rx beam and any Tx beam to form a Tx-Rx beam pair for measurement. For example, during the synchronization periods 802-805, the UE does not follow any fixed Tx beam or Rx beam pattern during a synchronization period. Furthermore, Rx beams 1, 2, and 4, as shown in FIG. 5A have at least partial LoS with one or more Tx beams. Thus, as shown in FIG. 8, Rx beams 1, 2, and 4 are measured more frequently than Rx beam 3, which does not have any LoS with any of the Tx beams. There may or may not be a real gap between two synchronization periods, depending how a synchronization period is defined. For the purpose of delineation convenience, a gap is shown between two synchronization periods of FIG. 8.

Figure 9:
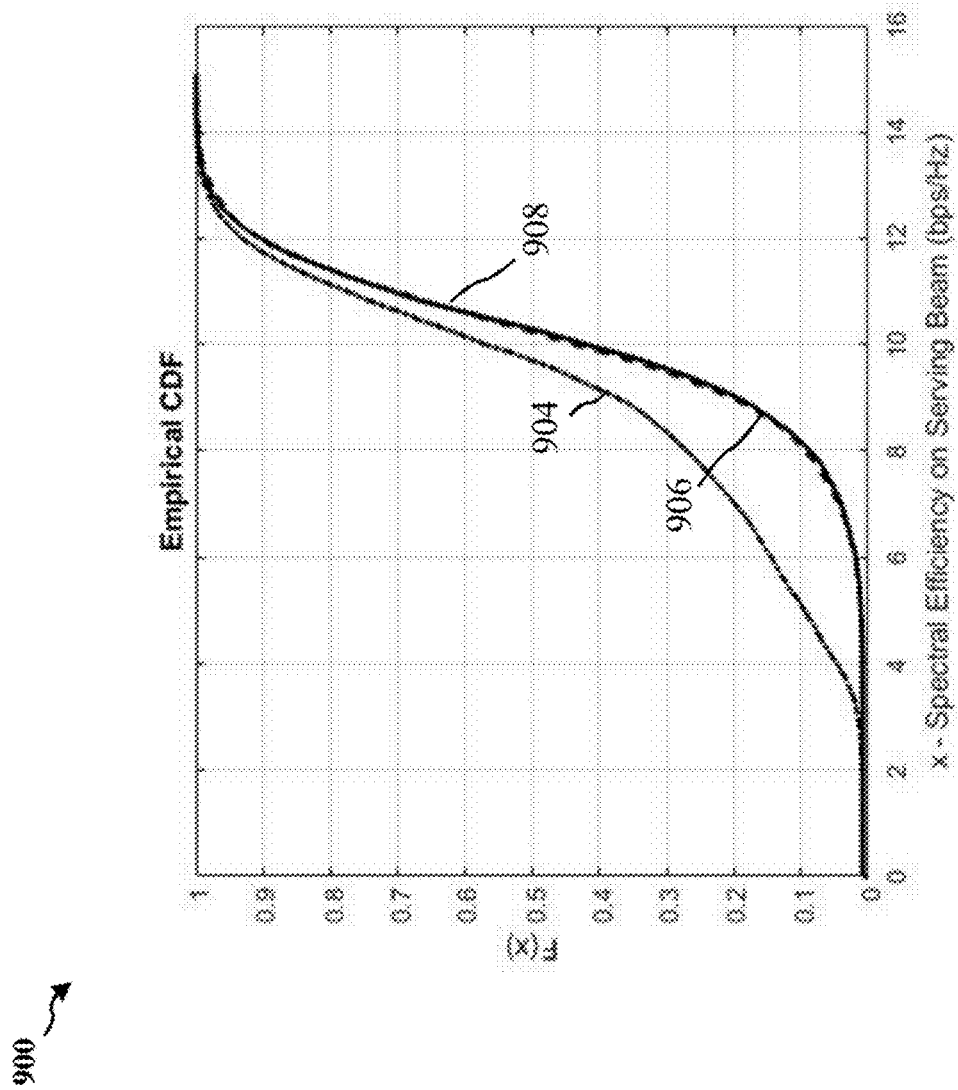
FIG. 9 show performance results of different methods for selecting an active beam pairs, in accordance with one or more aspects of the present disclosure.

FIG. 9 shows the performance results 900 of different methods for selecting beam pairs for measurement. The results 900 is for a scenario where the UE itself is in a fast rotation. While the UE is in a fast rotation, the active Tx-Rx beam pair may need to be re-selected frequently to maintain a desirable performance in term of beam gain.

The Y axis of FIG. 9 shows the cumulative density function (CDF) F(x) values, representing the opportunity values for beam pairs selected based on the respective method. The X axis shows the beam gains for the beam pair selection method. The base line 904 represents the result of the fixed, round-robin beam pair selection method. The genie line 908 represents theoretical optimal results. The line 906 represent performance results based on the dynamic stochastic beam pair selection method, as illustrated in FIG. 7, where the UE is free to select any of the Tx beams and any of Rx beams for a Tx-Rx beam pair measurement. The performance results 900 show that the performance based on the dynamic stochastic beam pair selection method is very close to that of theoretical optimal line 908, and much better than that of the round-robin beam pair selection method.

FIG. 10 is a conceptual data flow diagram 1000 illustrating the data flow between different means/components in an exemplary apparatus 1002. The apparatus may be a mmW capable UE in communication with a base station. The apparatus includes a reception component 1004 that is configured to receive data and control information from the base station. For example, the reception component 1004 of the mmW capable UE may receive a set of Tx beams from the base station in a broadcast message.

The apparatus 1002 also includes a stochastic beam pair selection and measurement component 1006 that receives beam pairs from the reception component 1004, selects a candidate beam pair and measure the selected beam pair. The apparatus 1002 also includes an active Tx-Rx beam pair determination component 1008 that receive measurement results from beam pair selection and measurement component 1006, and determines a new active Tx-Rx beam pair based on the measurement results. The apparatus 1002 further includes the transmission component 1010 that transmits the determined active Tx-Rx beam pair to the base station 1050.

The apparatus may include additional components that perform each of the blocks of the algorithm in the aforementioned flowcharts of FIGS. 5 and 6. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, and 1010, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the transmission component 1010. In addition, the transceiver 1110 receives information from the processing system 1114, specifically the reception component 1004, and based on the received information, generates a signal to be applied to the one or more antennas 1120.

The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, and 1010. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE) capable of millimeter wave (mmW) communication with a serving base station, comprising:
    iteratively performing, until a predetermined number of synchronization cycles is reached, a process comprising:
        selecting one from a plurality of Transmit (Tx)-Receive (Rx) beam pairs between the UE and the serving base station based at least in part on a scheduling opportunity value of each Tx-Rx beam pair of the plurality of Tx-Tx beam pairs that has not been measured for a current synchronization period; and
        measuring a strength of the selected Tx-Rx beam pair between the UE and the serving base station; and
    determining a new serving Tx-Rx beam pair between the UE and the serving base station based on cumulative strengths of the plurality of Tx-Rx beam pairs.

2. The method of claim 1, further comprising
    switching to the determined new serving Tx-Rx beam pair; and
    transmitting and/or receiving data using the new serving Tx-Rx beam pair.

3. The method of claim 1, further comprising
    receiving a set of Tx beams from a serving base station in a broadcast message.

4. The method of claim 1, wherein the scheduling opportunity value for the Tx-Rx beam pair is determined based at least in part on a priority weight, a cumulative density function (CDF) of a measured strength of the selected Tx-Rx beam pair, or a combination thereof.

5. The method of claim 4, wherein the priority weight of the Tx-Rx beam pair is updated based in part on a spatial proximity between the Tx-Rx beam pair, a presence or absence of a line of sight (LOS) between the Tx-Rx beam pair, the priority weight of the Tx-Rx beam pair, or a combination thereof.

6. The method of claim 5, wherein the scheduling opportunity value is proportional to a probability of the Tx-Rx beam pair being selected for measurement during the predetermined number of synchronization cycles, and wherein a scheduling ratio of the Tx-Rx beam pair to a second Tx-Rx beam pair is related to a ratio of the priority weight of the Tx-Rx beam pair to a second priority weight of the second Tx-Rx beam pair.

7. The method of claim 5, further comprising
    assigning an initial scheduling opportunity value to each of the Tx-Rx beam pairs by
        assigning a same initial value to each of the Tx-Rx beam pairs; or
        assigning the initial scheduling opportunity value for each of the Tx-Rx beam pairs based in part on a spatial proximity between the Tx-Rx beam pair and historical data of the Tx-Rx beam pair.

8. The method of claim 4, wherein measuring the strength of the selected Tx-Rx beam pair further comprises
    measuring one or more of a signal to noise ratio (SNR), a signal to noise/interference ratio (SNIR), a reference signal received quality (RSRQ), a reference signal received power (RSRP), or a beam gain of the selected Tx-Rx beam pair;
    updating the priority weight for the selected Tx-Rx beam pair based in part on the measured strength;
    updating the scheduling opportunity value based in part on the updated priority weight; or a combination thereof.

9. The method of claim 1, wherein selecting one of the plurality of Tx-Rx beam pairs further comprises selecting a Rx beam and a Tx beam to form the Tx-Rx beam pair without a constraint of a fixed Rx beam pattern or a fixed Tx beam pattern.

10. The method of claim 1, wherein determining the new serving Tx-Rx beam pair further comprises selecting as the new serving Tx-Rx beam pair a Tx-Rx beam pair with a highest cumulative beam strength, wherein the highest cumulative beam strength is a sum of beam strengths of the Tx-Rx beam pair for a duration of the predetermined number of synchronization cycles.

11. An apparatus for wireless communication at a user equipment (UE), comprising:
    means for iteratively performing, until a predetermined number of synchronization cycles is reached, a process comprising:
        selecting one of a plurality of Transmit (Tx)-Receive (Rx) beam pairs between the UE and a serving base station of based at least in part on a scheduling opportunity value of each Tx-Rx beam pair of the plurality of Tx-Tx beam pairs that has not been measured for a current synchronization period; and
        measuring a strength of the selected Tx-Rx beam pair; and
    means for determining a new serving Tx-Rx beam pair between the UE and the serving base station based on cumulative strengths of the plurality of Tx-Rx beam pairs.

12. The apparatus of claim 11, further comprising
    means for switching to the determined new serving Tx-Rx beam pair; and
    means for transmitting and/or receiving data using the new serving Tx-Rx beam pair.

13. The apparatus of claim 11, further comprising
    means for receiving a set of Tx beams from a serving base station in a broadcast message.

14. The apparatus of claim 11, wherein the scheduling opportunity value for the Tx-Rx beam pair is determined based at least in part on a priority weight, a cumulative density function (CDF) of a measured strength of the selected Tx-Rx beam pair, or a combination thereof.

15. The apparatus of claim 14, wherein the priority weight of the Tx-Rx beam pair is updated based in part on a spatial proximity between the Tx-Rx beam pair, a presence or absence of a line of sight (LOS) between the Tx-Rx beam pair, the priority weight of the Tx-Rx beam pair, or a combination thereof.

16. The apparatus of claim 15, wherein the scheduling opportunity value is proportional to a probability of the Tx-Rx beam pair being selected for measurement during the predetermined number of synchronization cycles, and wherein a scheduling ratio of the Tx-Rx beam pair to a second Tx-Rx beam pair is related to a ratio of the priority weight of the Tx-Rx beam pair to a priority weight of the second Tx-Rx beam pair.

17. The apparatus of claim 15, further comprising
    means for assigning an initial scheduling opportunity value to each of the Tx-Rx beam pairs by
        assigning a same initial value to each of the Tx-Rx beam pairs; or assigning the initial scheduling opportunity value for each of the Tx-Rx beam pairs based in part on a spatial proximity between the Tx-Rx beam pair and historical data of the Tx-Rx beam pair.

18. The apparatus of claim 14, wherein measuring the strength of the selected Tx-Rx beam pair further comprises
measuring one or more of a signal to noise ratio (SNR), a signal to noise/interference ratio (SNIR), a reference signal received quality (RSRQ), a reference signal received power (RSRP), or a beam gain of the selected Tx-Rx beam pair;
updating the priority weight for the selected Tx-Rx beam pair based in part on the measured strength;
updating the scheduling opportunity value based in part on the updated priority weight; or
a combination thereof.

19. The apparatus of claim 11, wherein means for selecting one of the plurality of Tx-Rx beam pairs further comprises selecting a Rx beam and a Tx beam to form the Tx-Rx beam pair without a constraint of a fixed Rx beam pattern or a fixed Tx beam pattern.

20. The apparatus of claim 11, wherein means for determining the new serving Tx-Rx beam pair further comprises selecting as the new serving Tx-Rx beam pair a Tx-Rx beam pair with a highest cumulative beam strength, wherein the highest cumulative beam strength is a sum of beam strengths of the Tx-Rx beam pair for a duration of the predetermined number of synchronization cycles.

21. An apparatus for wireless communication at a user equipment (UE), comprising:
a transceiver;
a memory; and
at least one processor coupled to at least one of the memory and configured to:
iteratively perform, until a predetermined number of synchronization cycles is reached, a process comprising:
selecting one of a plurality of Transmit (Tx)-Receive (Rx) beam pairs between the UE and a serving base station based at least in part on a scheduling opportunity value of each Tx-Rx beam pair of the plurality of Tx-Tx beam pairs that has not been measured for a current synchronization period; and
measuring a strength of the selected Tx-Rx beam pair; and
determine a new serving Tx-Rx beam pair between the UE and the serving base station based on cumulative strengths of the plurality of Tx-Rx beam pairs.

22. The apparatus of claim 21, wherein the at least one processor is further configured to
switch to the determined new serving Tx-Rx beam pair; and
transmit and/or receive data using the new serving Tx-Rx beam pair.

23. The apparatus of claim 21, wherein the at least one processor is further configured to
receive a set of Tx beams from a serving base station in a broadcast message.

24. The apparatus of claim 21, wherein the scheduling opportunity value for the Tx-Rx beam pair is determined based at least in part on a priority weight, a cumulative density function (CDF) of a measured strength of the selected Tx-Rx beam pair, or a combination thereof.

25. The apparatus of claim 24, wherein the priority weight of the Tx-Rx beam pair is updated based in part on a spatial proximity between the Tx-Rx beam pair, a presence or absence of a line of sight (LOS) between the Tx-Rx beam pair, the priority weight of the Tx-Rx beam pair, or a combination thereof.

26. The apparatus of claim 25, wherein the scheduling opportunity value is proportional to a probability of the Tx-Rx beam pair being selected for measurement during the predetermined number of synchronization cycles, and wherein a scheduling ratio of the Tx-Rx beam pair to a second Tx-Rx beam pair is related to a ratio of the priority weight of the Tx-Rx beam pair to a priority weight of the second Tx-Rx beam pair.

27. The apparatus of claim 25, wherein the at least one processor is further configured to
assign an initial scheduling opportunity value to each of the Tx-Rx beam pairs by
assigning a same initial value to each of the Tx-Rx beam pairs; or
assigning the initial scheduling opportunity value for each of the Tx-Rx beam pairs based in part on a spatial proximity between the Tx-Rx beam pair and historical data of the Tx-Rx beam pair.

28. The apparatus of claim 24, wherein measuring the strength of the selected Tx-Rx beam pair further comprises
measuring one or more of a signal to noise ratio (SNR), a signal to noise/interference ratio (SNIR), a reference signal received quality (RSRQ), a reference signal received power (RSRP), or a beam gain of the selected Tx-Rx beam pair;
updating the priority weight for the selected Tx-Rx beam pair based in part on the measured strength;
updating the scheduling opportunity value based in part on the updated priority weight; or
a combination thereof.

29. The apparatus of claim 21, wherein the at least one processor is further configured to select one of the plurality of Tx-Rx beam pairs further by selecting a Rx beam and a Tx beam to form the Tx-Rx beam pair without a constraint of a fixed Rx beam pattern or a fixed Tx beam pattern.

30. The apparatus of claim 21, wherein the at least one processor is further configured to determine the new serving Tx-Rx beam pair by selecting as the new serving Tx-Rx beam pair a Tx-Rx beam pair with a highest cumulative beam strength, wherein the highest cumulative beam strength is a sum of beam strengths of the Tx-Rx beam pair for a duration of the predetermined number of synchronization cycles.

* * * * *